(12) United States Patent
Robin et al.

(10) Patent No.: US 9,291,770 B2
(45) Date of Patent: Mar. 22, 2016

(54) METHOD OF MANUFACTURING A RADIATION-RESISTANT OPTICAL FIBER, RADIATION-RESISTANT OPTICAL FIBER AND DEVICE INCLUDING SUCH A FIBER

(71) Applicants: Thierry Robin, Camlez (FR); Arnaud Laurent, Quemperven (FR)

(72) Inventors: Thierry Robin, Camlez (FR); Arnaud Laurent, Quemperven (FR)

(73) Assignees: IXBLUE, Marly le Roi (FR); CENTRE NATIONAL D'ETUDES SPATIALES—CNES, Paris (FR)

( * ) Notice: Subject to any disclaimer, the term of this patent is extended or adjusted under 35 U.S.C. 154(b) by 100 days.

(21) Appl. No.: 14/320,861

(22) Filed: Jul. 1, 2014

(65) Prior Publication Data

US 2015/0331182 A1    Nov. 19, 2015

(30) Foreign Application Priority Data

Jul. 5, 2013 (FR) ..................... 13 56665

(51) Int. Cl.
*G11B 33/02* (2006.01)
*G11B 33/14* (2006.01)
(Continued)

(52) U.S. Cl.
CPC .......... *G02B 6/032* (2013.01); *C03B 37/02781* (2013.01); *C03C 13/045* (2013.01);
(Continued)

(58) Field of Classification Search
CPC ........... G02B 6/02295; G02B 6/02314; G02B 6/02328; G02B 6/02333; G02B 6/02366; G02B 6/032; G02B 6/2551; G02B 2006/0325; C03B 37/01205; C03B 37/02781; C03B 2201/21; C03B 2201/22; C03C 25/62; C03C 25/104; C03C 25/1075; C03C 25/108; C03C 13/045

USPC ................ 385/96, 123–128; 65/385
See application file for complete search history.

(56) References Cited

U.S. PATENT DOCUMENTS

| 6,587,625 B1 * | 7/2003 | Abate ............... G02B 6/02 385/124 |
|---|---|---|
| 2002/0154874 A1 | 10/2002 | Ahrens et al. |
| 2005/0078714 A1 | 4/2005 | Komine |

FOREIGN PATENT DOCUMENTS

| EP | 1 523 075 | 4/2005 |
|---|---|---|
| FR | 2954525 | 6/2011 |

(Continued)

OTHER PUBLICATIONS

French Search Report dated Mar. 4, 2014, corresponding to the Foreign Priority Application No. 13 56665.

*Primary Examiner* — Akm Enayet Ullah
*Assistant Examiner* — Michael Mooney
(74) *Attorney, Agent, or Firm* — Young & Thompson

(57) ABSTRACT

A method of manufacturing a radiation-resistant optical fiber and a thus-obtained radiation-resistant optical fiber, the method includes the following steps:
a) manufacturing a silica optical fiber preform;
b) forming, in the preform, a longitudinal cavity;
c) drawing the preform so as to form an optical fiber (1) including a core (2), an optical cladding (6) and at least one longitudinal cavity (3) having at least one opening (13) at one end of the optical fiber (1);
d) applying, during step c) of fiber drawing, a gas-tight coating (4);
e) exposing the optical fiber (1) to a gaseous substance, including preferably gaseous hydrogen and/or gaseous deuterium, in such a way to incorporate the gaseous substance in silica via the opening (13); and
f) closing any opening (13) at both ends of the optical fiber.

20 Claims, 3 Drawing Sheets

(51) Int. Cl.
*G02B 6/02* (2006.01)
*G02B 6/032* (2006.01)
*C03B 37/027* (2006.01)
*C03C 25/10* (2006.01)
*C03C 13/04* (2006.01)
*G02B 6/255* (2006.01)

(52) U.S. Cl.
CPC ............. *C03C25/104* (2013.01); *C03C 25/108* (2013.01); *C03C 25/1075* (2013.01); *G02B 6/02295* (2013.01); *G02B 6/02328* (2013.01); *C03B 2201/21* (2013.01); *C03B 2201/22* (2013.01); *G02B 6/2551* (2013.01); *G02B 2006/0325* (2013.01)

(56) References Cited

FOREIGN PATENT DOCUMENTS

| WO | 2009/054745 | 4/2009 |
| WO | 2012/004547 | 1/2012 |

* cited by examiner

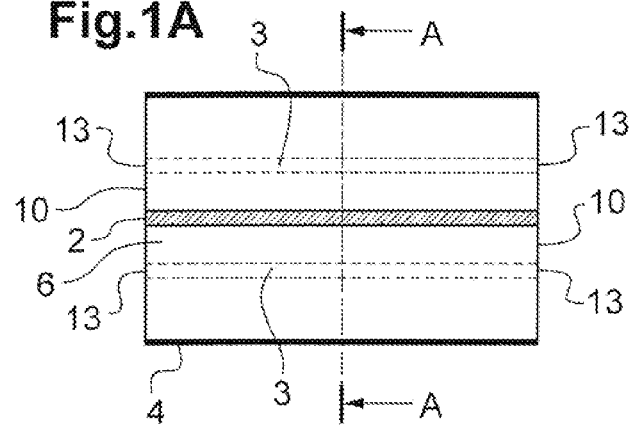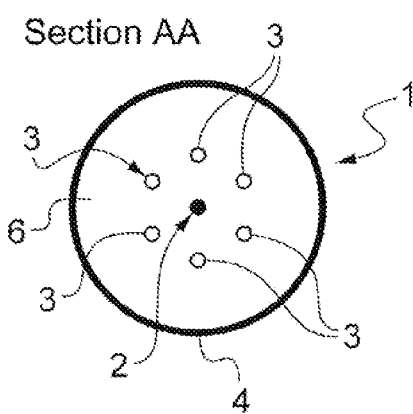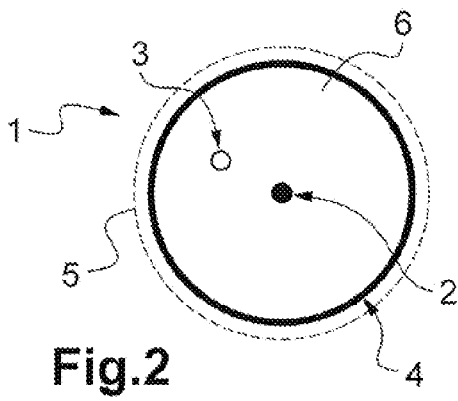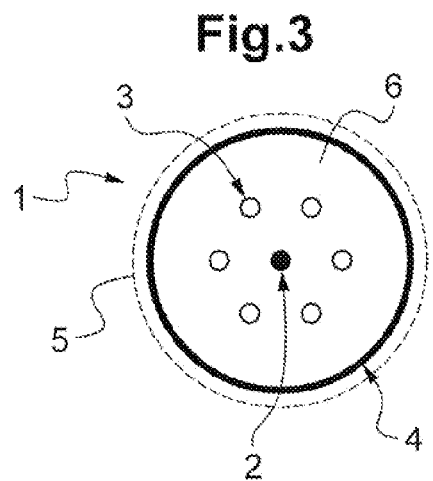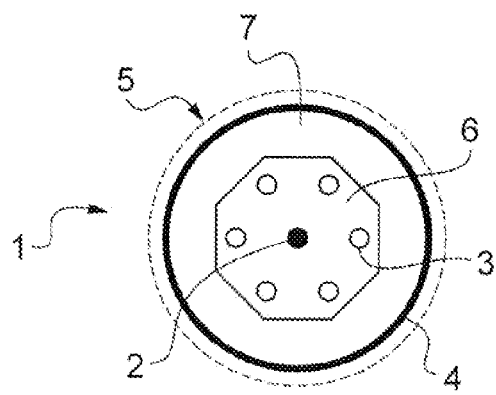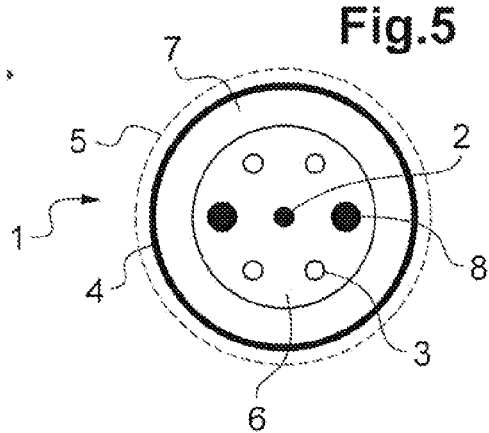

METHOD OF MANUFACTURING A RADIATION-RESISTANT OPTICAL FIBER, RADIATION-RESISTANT OPTICAL FIBER AND DEVICE INCLUDING SUCH A FIBER

FIELD OF THE INVENTION

The present invention relates to the hardening of optical fibers intended to be used in a radiative environment such as space or nuclear environment. In particular, the invention relates to the hardening of non-doped optical fibers for the transmission of optical signals. The invention also relates to the hardening of doped optical fibers, in particular for Erbium Doped Fiber Amplifier (EDFA) or Amplified Spontaneous Emission (ASE) source or fiber laser applications.

More precisely, the invention relates to a method for reinforcing the resistance of an optical fiber or a system incorporating an optical fiber in a radiative environment.

BACKGROUND OF THE INVENTION

As used herein, radiation means an electromagnetic or corpuscular radiation able to produce directly or indirectly ions, or to displace atoms during its passage through the atoms and the molecules of matter. The sources of radiation may be natural (cosmic radiation in space) or artificial, such as radiation of photons (X rays, Y rays), neutrons, protons, or heavy ions present in the nuclear installations, in scientific instruments or also in medical devices.

Unlike the electrical signals, the optical signals have the advantage not to interfere with the ionizing radiations, hence the interest for the optic-fiber devices in a radiative environment. However, it has been observed that exposing an optical fiber to radiations induces a degradation of the optical performances, in particular an increase of the attenuation per unit length of the fiber (called Radiation Induced Attenuation, RIA). Applications in space environment of the EDFA (used as lasers for communication between satellites) or of the ASE sources (for the optical fiber gyroscopes in satellites) or of the fiber lasers are today limited by radiation induced optical attenuation (RIA) phenomena, due in particular to the ionizing radiations present in space.

Many studies have been performed on various types of optical fibers to analyse the effects of the RIA, by determining the causes and searching for treatments allowing to improve the resistance of the optical fibers to radiations.

As used herein, silica optical fiber (or just optical fiber) means an optical fiber based on silica, wherein the silica optical fiber can also comprise other elements (germanium, phosphorus, aluminum, boron, fluorine . . . ) and/or air, and can be doped or non doped.

On the one hand, the radiation induced attenuation depends on the type of radiation, on the dose rate and on the total dose received by an optical fiber. On the other hand, the radiation induced attenuation strongly depends on the composition of the fiber and varies in particular according to whether it is a fiber with a core made of pure silica, phosphorus-doped silica, or a rare earth-doped optical fiber.

Moreover, it is known that the addition of gaseous hydrogen diluted in silica is advantageous for the resistance to radiations. Indeed, the presence of hydrogen allows to remove some colour centers (point defects due to vacancies, interstitial defects). Hydrogen limits the RIA phenomena and hence improves the performance of the fibers in a radiative environment, and in particular space environment.

A conventional method of hydrogenation consists in exposing a silica optical fiber, doped or not, to a pressure of gaseous hydrogen going up to about 300 bars, at a temperature of 80° C. during a relatively limited time, of the order of 48 hours for a silica fiber of 125 micrometers diameter. This method allows introducing gaseous hydrogen in the silica.

However, the presence of gaseous hydrogen dissolved in silica, and in particular at the core of the fiber, translates into the appearance of many bands of absorption at different wavelengths and of various intensities (cf. J. Stone, "Interactions of Hydrogen and Deuterium with Silica Optical Fibers: A Review", Journal of Lightwave Technology, Vol. LT-5, no. 5, pp. 712-733, 1987). Although hydrogen is generally considered as transparent in the C-band (1530-1565 nm), it is observed in practice, in the C-band, an attenuation background that increases with the dilution of hydrogen.

The use of deuterium, instead and in place of hydrogen, offers the same benefits in terms of RIA, but has the additional advantage that it limits the losses induced by the gas present in the core in the C-band, which improves in proportion the performances of the optical fibers in the spectral band towards 1.5 micrometers.

However, the incorporated hydrogen or deuterium does not remain naturally in the silica and desorbs as a function of time over a variable duration from a few hours to a few days as a function of the ambient temperature.

A solution to limit the desorption of the gaseous hydrogen is to apply a carbon coating of a few hundreds of Angstrom in order to render an erbium-doped fiber tight to the diffusion of gas (Zotov, K. V, Likhachev, M. E., Tomashuk, A. L., Bubnov, M. M., Yashkov, M. V, Guryanov, A. N., & Klyamkin, S. N., "Radiation-resistant erbium-doped fiber for spacecraft applications", 4-7, 2007). The thin carbon coatings are commonly used in industrial applications to render a fiber tight to the diffusion of gas from the outside and towards the inside of an optical fiber. In particular, a tight carbon coating is applied to protect the fibers used in the petrol field as a temperature and/or pressure sensor during drilling operations, which are subjected to conditions where the temperature reaches 250° C. and where the content of gaseous hydrogen may be high. The thin carbon coating is applied during the fiber drawing.

However, such a tight coating is gas-tight and, in practice, it is therefore very difficult to charge a carbon-coating fiber with gaseous hydrogen through this tight coating. To diffuse gaseous hydrogen through a tight carbon coating, even a very thin one (i.e. with a thickness lower than about 50 nm), very restricting operational conditions are required: the carbon coating fiber has to be maintained under a high pressure of hydrogen (5 to 110 MPa), at a high temperature (about 200° C.) and during a very long duration (about twenty days). This method allows to efficiently incorporate hydrogen inside the tight-coating fiber and hence to reduce the radiation induced attenuation (RIA).

Nevertheless, the tight-coating optical fibers having undergone such an hydrogenation treatment exhibit a very strong absorption over the whole spectrum and in particular between 1.4 and 1.8 µm. Indeed, at a high temperature, hydrogen forms permanent bonds of the O—H type that induce a strong optical attenuation in the C-band, with in particular a very strong attenuation band at 1380 nm and also at 1270 nm and 950 nm. Moreover, it is observed an increasing absorption as a function of the pressure of hydrogen in the spectral domain of 1050 to 1350 nm. In reality, the attempts of gaseous hydrogen insertion by this high temperature method through a tight coating end in the fixation of hydrogen in the form of O—H bonds. Finally, this method does not allow to measure the quantity of incorporated hydrogen. Now, for a too strong concentration of incorporated hydrogen, it is observed a drastic fall of the efficiency of a laser based on such an erbium-doped optical fiber. In these conditions, the optical-amplification efficiency of the erbium-doped fibers is noticeably reduced, which puts into perspective the improvement of the fiber hardening.

SUMMARY OF THE INVENTION

One object of the invention is to propose a method of manufacturing an optical fiber, in particular a rare earth-doped one, which is radiation resistant. Another object of the invention is to propose such a method of manufacturing an optical fiber, which is rapid and efficient. Another object of the invention is to propose a method for incorporating, in an optical fiber, a gaseous substance, preferably gaseous hydrogen or gaseous deuterium, in a controlled manner.

The present invention has for object to remedy the drawbacks of the state of the art thanks to a method of manufacturing a radiation-resistant optical fiber, the method comprising the following steps:

a) manufacturing a silica optical fiber preform having a longitudinal axis, a core and an optical cladding;

b) forming, in the preform, at least one longitudinal cavity;

c) drawing said preform so as to form a silica optical fiber comprising a core, an optical cladding and at least one longitudinal cavity, said longitudinal cavity having at least one opening at one end of the optical fiber;

d) applying, during step c) of fiber drawing, a gas-tight coating, preferably made of carbon or metal, while keeping at least one opening towards a longitudinal cavity at one end of the optical fiber;

e) exposing the optical fiber to a gaseous substance, comprising preferably gaseous hydrogen and/or gaseous deuterium, in controlled conditions of pressure, temperature and duration of exposure, so as to incorporate a determined quantity of said gaseous substance in the silica via said at least one opening;

f) closing any opening at both ends of the optical fiber so as to form an optical fiber incorporating said gaseous substance and said optical fiber being tight to the diffusion of said gaseous substance outside the optical fiber.

The invention allows to manufacture in a relatively simple manner an optical fiber that is resistant to the RIA effects without inducing spurious absorptions in the optical transmission and/or amplification bands of the fiber.

Advantageously, the fiber includes at least one longitudinal cavity, extending following an axis parallel to the longitudinal axis of the fiber, said longitudinal cavity being distant from the core of the fiber, or being part of the optical cladding around the core, said longitudinal cavity comprising an opening at each end of the optical fiber.

According to particular and advantageous aspects of the method of manufacturing a radiation-resistant optical fiber of the invention:

the step b) of forming, in the preform, at least one longitudinal cavity comprises the formation of a longitudinal groove in said preform or the formation of a cylindrical hole of axis parallel to the longitudinal axis of the preform or the assembly of a hollow tube;

the step f) of closing comprises a step of welding one end of said optical fiber (having at least one opening) to another solid optical fiber and/or a step of necking welding one end of the optical fiber, said necking welding being adapted to close said optical fiber end;

following step e) of incorporating a gaseous substance and before step f) of closing, the method further comprises a step of desorbing said incorporated gaseous species so as to reduce the incorporated gaseous species concentration in the optical fiber.

Advantageously, during step e) of exposure to a gaseous substance and/or during the step of desorption, the method of manufacturing a radiation-resistant optical fiber comprises a step of controlling the quantity of incorporated gaseous substance, by means of a spectroscopic measurement of a specific band linked to said gaseous substance, preferably an absorption band linked to hydrogen or deuterium.

In a particular embodiment, the method of manufacturing a radiation-resistant optical fiber comprises a step of measuring the optical transmission or the optical back-scattering through the core of the optical fiber during step c) of injection of a gaseous substance and/or during step e) of exposure to a gaseous substance and/or during the step of desorption of said incorporated gaseous species, so as to measure the quantity of gaseous substance incorporated in the silica fiber.

According to other particular and advantageous aspects of the method of manufacturing a radiation-resistant optical fiber of the invention:

said optical fiber comprises a second cladding surrounding the first optical cladding and wherein said longitudinal cavity is located in the first optical cladding;

said gaseous substance is chosen among gaseous hydrogen and/or gaseous deuterium or a gaseous mixture of hydrogen and deuterium.

The invention also relates to a radiation-resistant silica optical fiber comprising a core and an optical cladding.

According to the invention, said optical fiber further comprises:

at least one longitudinal cavity arranged inside the optical cladding, the longitudinal cavity being closed at both ends of the optical fiber;

said optical fiber comprising a determined concentration of gaseous substance, preferably chosen among gaseous hydrogen and/or gaseous deuterium; and a coating tight to the diffusion of said gaseous substance, the tight coating preferably comprising a thin layer of carbon or metal.

The invention allows to have an optical fiber resistant to the RIA effects, which exhibits excellent optical performances in terms of optical transmission and/or amplification and whose performances are steady over time.

According to particular and advantageous aspects of the radiation-resistant optical fiber of the invention:

the core of the fiber comprises one or several elements among: silicon, germanium, phosphorus, aluminum, boron, fluorine and/or one or several rare-earth dopants among lanthanum, cerium, erbium, ytterbium, neodymium, thulium and/or holmium;

said optical fiber is a microstructured optical fiber, a photonic crystal optical fiber, an air-clad fiber, a polarization-maintaining optical fiber, a polarizing optical fiber, a double-clad optical fiber, a multi-core optical fiber or a multi-clad optical fiber.

The invention also relates to an optic-fiber device comprising at least one radiation-resistant silica optical fiber according to one of the embodiments described.

The invention will find a particularly advantageous application in the manufacturing of optical fibers, doped or not, and of systems based on these optical fibers and intended to be used in a radiative environment such as space environment, nuclear and scientific instrumentation fields or in medical devices using radiations.

The invention advantageously allows to determine the dose of molecular gas incorporated in the optical fiber so as to control that the gas concentration is sufficient to obtain an effect of protection against the RIA effects and that this concentration is lower than a maximum threshold beyond which a strong attenuation is induced in the transmission wavelength band of the fiber and/or in the pumping wavelength band of the fiber.

The present invention also relates to the characteristics that will be revealed by the following description and that will have to be considered in isolation or according to all their technically possible combinations.

BRIEF DESCRIPTION OF THE DRAWINGS

This description, which is given only by way of non-limitative example, will allow a better understanding of how the invention can be implemented with reference to the appended drawings, in which:

FIG. 1 schematically shows an exemplary embodiment of an optical fiber in longitudinal sectional view (FIG. 1A) and in transverse sectional view (FIG. 1B);

FIG. 2 schematically shows another example of optical fiber according to another embodiment of the invention;

FIG. 3 schematically shows an example of optical fiber according to a variant of FIG. 1;

FIG. 4 schematically shows an example of double-clad optical fiber according to another embodiment of the invention;

FIG. 5 schematically shows an example of polarization-maintaining optical fiber of the double-clad Panda type according to another embodiment of the invention;

DETAILED DESCRIPTION OF THE INVENTION

Figure 6:
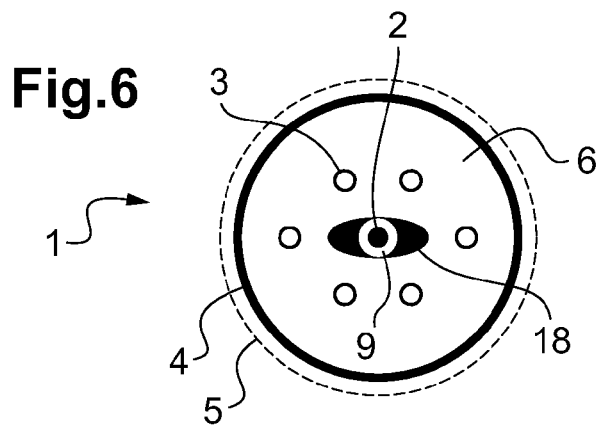
FIG. 6 schematically shows an example of polarization-maintaining optical fiber of the simple-clad elliptic type according to another embodiment of the invention.

An embodiment of the invention is based on the use of a fiber drawn preform with holes having a tight coating, of the thin metal or carbon coating type, to obtain a hollow optical fiber whose holes, or open cavities, are filled with gaseous hydrogen or deuterium and closed at their ends before use. The thus-obtained optical fiber includes gaseous hydrogen and/or deuterium dissolved in the silica matrix and a thin gas-tight coating that allows to avoid the diffusion toward the outside of the incorporated gaseous hydrogen or deuterium.

FIG. 1 shows an exemplary embodiment of an optical fiber seen in longitudinal sectional view (FIG. 1A) and in transverse sectional view (FIG. 1B). The optical fiber 1 comprises a core 2 inside an optical cladding 6, with a refractive index lower than that of the core 2 so as to guide an optical signal propagating in the core 2. The optical cladding 6 is generally based on silica and the core 2 based on silica doped with one or several elements, known by the one skilled in the art. The sizes of the core 2 and of the optical cladding 6 of the optical fiber are proportional to the sizes of the core and of the optical cladding of the preform before fiber drawing.

In the example of FIG. 1, several longitudinal cavities 3 are provided in the optical cladding 6. These longitudinal cavities 3 extend from one end 10 of the fiber to the other end of the fiber, and are open through openings 13. The fiber also includes a gas-tight coating 4. However, the tight coating 4 does not close the openings 13 of the longitudinal cavities 3. In the example shown, six longitudinal cavities 3 are arranged in the optical cladding 6. By way of example, the tight coating 4 is consisted of a thin layer of graphitic carbon or pyrolytic carbon (also known as graphite-type carbon or cross-linked graphite structure).

The exact position of the holes 3 is not much important. It is sufficient that the minimum distance between the core 2 and any one of the cavities is greater than the distance to which the propagation of an optical signal propagating in the core is liable to be disturbed by evanescent coupling due to the presence of a longitudinal cavity 3. Likewise, the size of the longitudinal cavities 3 is not much important. By way of example, the longitudinal cavities 3 may be formed with holes of 3 µm diameter.

The longitudinal cavities of the optical fiber are generated from longitudinal cavities of homothetic sizes in the preform before fiber drawing.

The longitudinal cavities of the preform may be formed according to different manufacturing techniques known by the one skilled in the art.

For example, a longitudinal cavity may be formed in the preform by eccentric drilling from a preform having a uniformly solid cladding. In another example, a longitudinal cavity may be formed by assembling cylindrical sections of glass, void spaces being left between these preform sections. In still another exemplary embodiment, a longitudinal cavity may be formed in the preform by assembling a hollow glass tube with cylindrical glass sections complementary to the tube. In another exemplary embodiment, a longitudinal cavity may be formed by grooving a first cylindrical preform and inserting this grooved preform in a hollow tube. In this respect, the description of the document FR2954525A1 about different modes of manufacturing of preforms comprising cavities is fully incorporated herein.

A fiber drawing is performed, the holes of the preform being left open.

The fiber drawing of the preform is performed so that the thus-obtained optical fiber 1 includes at least one longitudinal cavity 3, said longitudinal cavity 3 having at least one opening 13 at one end of the optical fiber 1. During the fiber drawing, the cavities remain open during the whole fiber drawing and over the whole length of the optical fiber.

Moreover, during the fiber drawing of the preform, a tight coating 4 is applied around the optical cladding. Advantageously, the tight coating is a coating made of graphitic carbon or metal (aluminum or gold, for example). After the fiber drawing, the tight coating 4 has generally a thickness of the order of one nanometer to a few tens of nanometers. The tight coating 4 has generally a cylindrical shape, of annular section and of axis merged with the longitudinal axis of the optical fiber.

In certain embodiments, a conventional (non-tight) coating 5 is applied during the fiber drawing around the tight coating. The conventional coating 5 may include one or several layers of polymer, acrylate, polyimide and/or silicon. The total thickness of the conventional coating 5 is generally of a few micrometers to a few tens of micrometers.

After the fiber drawing, the optical fiber is cut into lengths. Each thus-obtained optical fiber length thus includes an opening 13 for each cavity 3 at each of its two ends 10.

As used hereinafter, optical fiber means an optical fiber length.

Advantageously, the ends 10 of the optical fiber 1 are cut to form end faces transverse to the longitudinal axis of the optical fiber.

After fiber drawing, an optical fiber 1 as illustrated in FIG. 1 is obtained, which includes a plurality of longitudinal cavities 3, each cavity having an opening 13 at each of the two ends 10 of the optical fiber. In a variant, the longitudinal cavity(ies) 3 have an opening 13 at only one end of the optical fiber and are closed at the other end.

An optical fiber 1 having a tight coating 4 and comprising one or several openings 13 leading respectively to one or several longitudinal cavities 3 inside the optical cladding 6 of the optical fiber 1 has thus been manufactured.

The thus-obtained optical fiber 1 is placed in a pressurized chamber in which a gaseous substance is injected, preferably gaseous hydrogen or gaseous deuterium or a mixture of gaseous hydrogen and deuterium. The gas enters into the longitudinal cavities 3 via the openings 13. That way, the optical fiber may be loaded with gaseous hydrogen and/or gaseous deuterium. The gas does not remain confined in the longitudinal cavities 3, but is dissolved in the optical fiber. The gas is dissolved in particular in the optical cladding and in the core of the optical fiber. The injection of gas is performed at low temperature, generally lower than 150° C., and preferably around 80° C. By way of illustration, a silica hollow fiber of 125 μm diameter is exposed to gaseous deuterium under a pressure of $2.10^7$ Pascal, at a temperature of 80° C., during 96 hours, until saturation of the silica with deuterium.

The step of injection of gaseous hydrogen and/or deuterium has for purpose to dissolve gaseous hydrogen and/or deuterium in the silica fiber via the openings and the cavities. The step of injection of gaseous hydrogen and/or deuterium via the holes is thus an intermediate step allowing to dissolve gaseous hydrogen and/or deuterium in the fiber.

In a particular and advantageous embodiment, the fiber is then desorbed in a controlled manner, after the step of filling with gaseous hydrogen or deuterium and before the closing of the openings 13 at both ends, while measuring in continuous the deuterium absorption peak towards 1.7 μm (or respectively that of hydrogen towards 1.24 μm) and heating the fiber at 80° C. The measurement of the absorption peak is performed by circulating a signal in the core of the fiber, for example in a configuration of transmission by means of a source and of an optical power-meter or in a configuration of back-scattering by means of an optical time domain reflectometer (OTDR). The optical fiber is hence desorbed in a controlled manner until obtaining a determined fraction of gaseous deuterium (respectively of gaseous hydrogen) dissolved in the optical fiber. In practice, a minimum threshold and a maximum threshold of the hydrogen, or respectively deuterium, absorption peak is determined, and this absorption peak is measured. Indeed, a too strong deuterium or hydrogen concentration has for effect to increase the attenuation background of the optical fiber and to reduce the performances of the optical fiber in terms of transmission or amplification according to the type of fiber. This desorption allows to maintain in the optical fiber only a fraction of deuterium or hydrogen sufficient for neutralizing the colour centers. Possibly, the method may be performed through several steps of gaseous substance loading and controlled desorption, until obtaining the desired concentration. This concentration is estimated to less than 10% of the maximal dilution.

Maintaining a relatively low temperature during the operations of gaseous substance injection and/or desorption allows to avoid the creation of permanent bonds or the O—H or the O-D type, liable to generate absorption bands harmful to the transmission of optical signals or of optical pumping beam.

After exposure of the optical fiber to the gaseous substance, the longitudinal cavities 3 of the fiber 1 are closed at their open ends, so as to imprison the gaseous hydrogen or the gaseous deuterium in the fiber 1.

Figure 8:
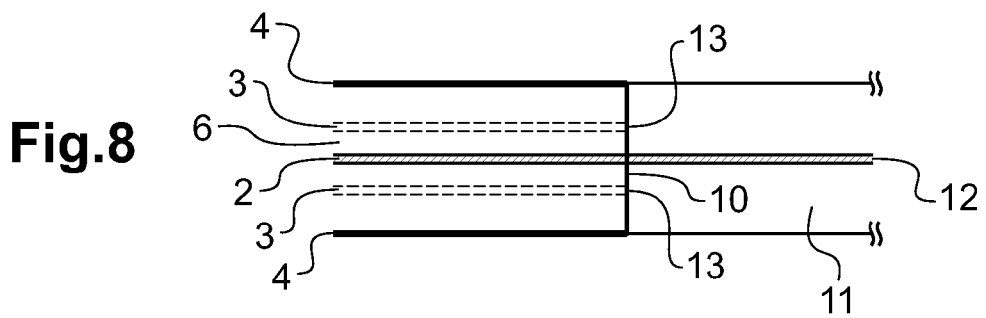
FIG. 8 schematically shows an exemplary embodiment of a step of welding a hollow optical fiber to another optical fiber.

In a preferred embodiment, shown in FIG. 8, one or both ends of the hollow fiber are welded to a conventional optical fiber 11, i.e. a fiber with no hole in the optical cladding, so as to block the openings 13. During the welding, the core 2 of the first optical fiber 1 is aligned to the core 12 of the second optical fiber 11. Advantageously, the optical cladding of the solid fiber 11 is also coated with a gas-tight coating, made of carbon or metal.

Figure 9:
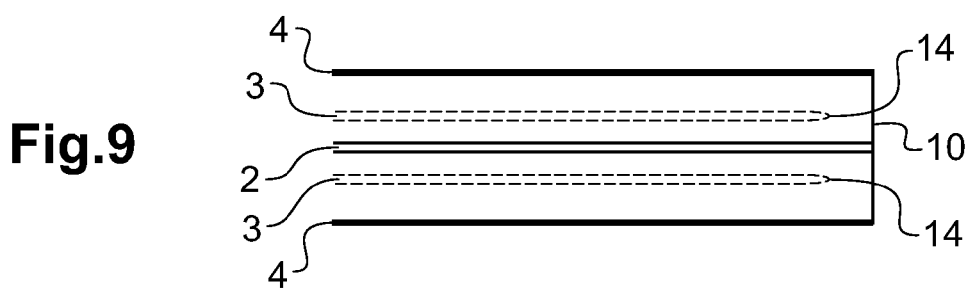
FIG. 9 schematically shows another exemplary embodiment of a step of welding to close one end of the hollow optical fiber.

In another embodiment, shown in FIG. 9, the application of a weld allows to close the opening 13 through the collapsing of the cavities 3 over themselves. In the example of FIG. 8, the weld is localized on the open end 10 of the optical fiber so as to form a longitudinal cavity 3 filled with gas and closed with an end 14.

In the two embodiments of FIGS. 8 and 9, only the ends of the optical fiber 1 are exposed to a high temperature during the welding.

For these welding operations, an optical fiber welding machine may be used, which may be of different types: arc-, plasma-, filament-welding machine or even a $CO_2$-laser welding. The preferred welding method is the welding to a solid fiber because, in most of the applications, the optical fiber is integrated to an optical assembly and hence welded to an input and output fiber.

During the welding, the cavities are generally no longer fed by injection of gas. The gas may then exit from the cavities. However, after the closing of the ends of the optical fiber, the gas dissolved in the fiber fills again the cavities, through a balancing of the partial pressures between the gas dissolved in the silica and the gas filling the cavities. The closing of the cavities at the ends of the fiber allows to keep a relatively high partial pressure of hydrogen or deuterium and limits the diffusion of gas to a very low residual diffusion of the gas towards the outside of the optical fiber.

The optical fiber 1 is then loaded with gaseous hydrogen or gaseous deuterium by the inside of the fiber and not through the gas-tight coating 4. The gas is in part dissolved in the silica optical fiber. It remains gas in the cavity(ies), which are, in a way, a $H_2$ and/or $D_2$ tank. A balance of the partial pressures is established between the gas dissolved in the silica and that present in the holes. The fiber being coated with a tight coating 4 and being closed at its two ends, the gas enclosed in the fiber can in practice not diffuse outside the fiber. In the case of the welding of an open end to a solid fiber, the solid fiber is preferably also coated with a tight coating. The gas dissolved in the fiber can, residually, diffuse towards the end welded to the solid fiber, but cannot diffuse towards the outside. In the case of the necking welding of an end of the fiber provided with holes, the length of the necking zone, of several millimeters to several centimeters, makes the path of diffusion of the dissolved gas towards the outside almost infinite.

One of the advantages of the invention is that the hydrogen or the deuterium incorporated in the tight optical fiber remains dissolved in the silica fiber in gaseous form and is not fixed in the form of O—H bonds.

FIGS. 2 to 7 illustrate different examples of optical fibers considered, in a non-exhaustive manner, within the framework of the present invention. The same reference signs are used to denote similar elements in FIGS. 1 to 9.

Therefore, FIG. 2 shows an optical fiber, in transverse sectional view, comprising a core 2, an optical cladding 6 and a tight coating 4 made of carbon. The optical fiber of FIG. 2 also comprises, as an option, a conventional coating 5 of the acrylate type, in one or two layers, polyimide type and/or silicone type. The optical fiber of FIG. 2 includes a single longitudinal cavity 3 in the optical cladding 6. This embodiment is particularly simple and rapid to make.

FIG. 3 shows another example of optical fiber according to a variant of FIG. 1, the fiber being covered with a first tight coating 4 made of carbon and a conventional coating 5 arranged around the tight coating 4. The conventional coating 5 protects the tight coating 4 from the mechanical wearing liable to damage the thin layer of carbon. The optical fiber of FIG. 3 includes six longitudinal cavities 3, arranged approximately at the apexes of an hexagon. The position of the cavities 3 does not require an extremely precise positioning.

FIG. 4 schematically shows an example of a so-called double-clad optical fiber, the optical fiber 1 including a core 2 in a first optical cladding 6, which is surrounded by a second optical cladding 7 of low index. In a manner known per se, in the case of amplifying fibers, for example with a rare-earth-doped core, the second optical cladding serves to optically guide a pump wave coupled in the first optical cladding 6 for a longitudinal optical pumping. In the example of FIG. 4, the first optical cladding 6 has a non-circular and non-rotational symmetric section to allow an homogenization of the pump beam. By way of example, the optical cladding 6 has an octagonal section. A tight coating 4 surrounds the second cladding 7. Advantageously, a conventional coating 5 surrounds the tight coating 4. Longitudinal cavities 3 are arranged in the first optical cladding 6. By way of example, six cavities 3 have been represented in FIG. 4, however, a lower or higher number of cavities 3 may also suit. In the case of double-clad fibers, the longitudinal cavities 3 are preferably arranged inside the first optical cladding 6, i.e. the optical cladding 6 surrounding the core 2. Indeed, in the case of a double-clad fiber, the second cladding of low index is generally made of fluorinated silica. The holes could be formed therein, but in this case, the thickness of the second cladding 7 of low index should be increased so that there is no coupling between the pump signal propagating in the multi-mode part and the holes.

FIG. 5 schematically shows an example of polarization-maintaining optical fiber of the double-clad Panda type, according to particular embodiment of the invention. In a manner known per se, a polarization-maintaining fiber includes a core 2, a first optical cladding 6 and two stress bars 8 arranged symmetrically on either side of the core 2. The optical fiber 1 possibly includes a second optical cladding 7. The optical fiber 1 also includes a tight coating 4 made of carbon, arranged around the second optical cladding 7. Advantageously, a conventional protection coating 5 surrounds the tight coating 4. The stress bars 8 have a coefficient of expansion different from that of the optical cladding 6, so that they induce opto-mechanical stresses in the core of the fiber after the fiber drawing. According to the invention, at least one longitudinal cavity 3 is provided in the first optical cladding 6 of the fiber. In the example shown in FIG. 5, four longitudinal cavities 3 are prepared in the first optical cladding 6. Advantageously, the longitudinal cavities 3 are arranged so as to form with the two stress bars the apexes of an hexagon in a transverse sectional view of the fiber 1.

FIG. 6 shows another exemplary embodiment of a polarization-maintaining optical fiber of the simple-clad elliptic type. The optical fiber of FIG. 6 includes a core 2, surrounded by an optical guiding zone 9, of refractive index lower than the core 2. The optical guiding zone 9 is surrounded by a stress zone 18 of elliptic shape. An optical cladding 6 surrounds the elliptic stress zone 18. The optical fiber 1 also includes a tight coating 4 made of carbon, and advantageously, a conventional coating 5 surrounding the tight coating 4. According to this embodiment, the optical fiber further includes one or several longitudinal cavities 3 arranged in the optical cladding 6. In the example shown in FIG. 6, six longitudinal cavities 3 are arranged in the optical cladding 6, approximately at the apexes of an hexagon. Other numbers of longitudinal cavities 3 and other arrangements, geometrical or not, of the longitudinal cavities 3 in the optical cladding 6 are also possible.

Figure 7:
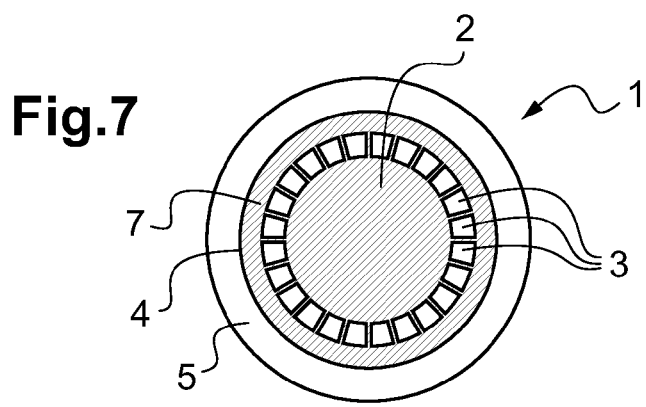
FIG. 7 schematically shows an example of air-clad optical fiber according to another embodiment of the invention.

FIG. 7 shows a transverse sectional view of an air-clad optical fiber according to another embodiment of the invention. The optical fiber of FIG. 7 includes a core 2, surrounded by an optical guiding zone formed by the juxtaposition of cavities 3 arranged as a ring about the core 2, a second silica optical cladding arranged around the ring of cavities 3, a tight coating 4 around the second optical cladding 7 and, as an option, a conventional coating 5 about the tight coating 4. The air-clad fibers allow to obtain a large-core single-mode optical fiber, wherein the diameter of the core 2 can reach several tens of micrometers. In this double-clad fiber, the multi-mode guiding is ensured by the ring of air formed by the juxtaposed cavities. The air-clad fibers find applications in particular in amplifiers and fiber lasers. In a conventional air-clad fiber, the cavities are generally filled with air. According to this embodiment, it is not necessary to form additional cavities in the preform, but a tight layer of carbon or metal has to be added to the fiber drawing on the outer silica before applying the plastic coating (of the polymer, acrylate, silicone, polyimide type . . . ). After the fiber drawing, the cavities of the air-clad fiber are filled with a mixture of air and gaseous hydrogen or gaseous deuterium. The addition of hydrogen and/or deuterium in small quantity does not modify significantly the index of the medium and does not disturb the multi-mode guiding in the double-clad fiber ensured by the ring of holes. An air-clad fiber, tight and loaded with gaseous hydrogen and/or deuterium, is hence obtained.

The examples of fibers represented in FIGS. 1 to 8 are not in any way limitative, and the one skilled in the art will adapt easily the method of the invention to other types of optical fibers, for example a multi-core optical fiber. In particular, this method can be applied to the microstructured fibers by applying a tight coating made of carbon or metal and by using the existing capillaries to fill them with gas. Moreover, the method can be applied whatever the outer diameter of the fiber.

The method applies to non-doped core fibers, such as the conventional fibers of the telecom type, as well as doped fibers.

An example of application of an erbium-doped optical fiber and the use thereof in an EDFA-type amplifier is illustrated hereinafter.

FIG. 9 is a view of a microphotography of a section of an optical fiber obtained according to an embodiment of the invention, wherein longitudinal cavities remain after the fiber drawing. The core of the optical fiber 22 and six cavities 23 arranged in the optical cladding 26 of the fiber can be seen in FIG. 9.

The fiber 20 of FIG. 9 is an erbium-doped tight fiber, and more precisely with a silica core 22 doped with germanium, aluminum, lanthanum and erbium. The numerical aperture of the core 22 is of 0.26. The diameter of the core is of 2.7 micrometers. The diameter of the optical cladding 26 of the fiber is of 125 micrometers. The cut-off wavelength is of 930 nm. The fiber 20 includes a tight coating 24 made of carbon and a conventional double acrylate coating. The absorption due to erbium towards 1530 nm is of 16 dB/m. The fiber includes six cavities 23 of 3 micrometers diameter, arranged symmetrically about the core. The cavities 23 are located half the way between the center of the fiber 20 and the periphery thereof, i.e. at about 30 micrometers from the center.

Figure 10:
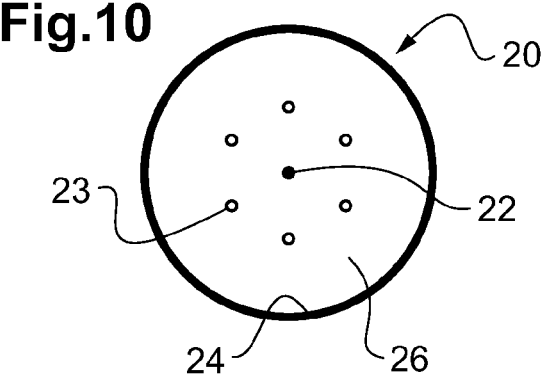
FIG. 10 is a view of a microphotography of a cross-section of an optical fiber obtained according to an embodiment of the invention.

This erbium-doped fiber 20 is used to manufacture an EDFA according to the scheme of FIG. 10. A laser diode 31 generates a signal at 1550 nm with a power of −20 dBm. A pump diode 32 generates a constant power of 100 mW. An optical isolator 33 is arranged between the source and a multiplexer 34. The multiplexer allows injecting the signal and the pump in the erbium-doped fiber 20. A second optical isolator 35 is arranged at the output of the erbium-doped fiber 20.

The resistance of the EDFA is then tested in radiative environment. The EDFA formed according to the scheme of FIG. 10 is exposed to a source of gamma radiation by means of a Cobalt-60 source. The radiation dose rate is of the order of 700 Rad/h.

The output power of the amplifier is initially of 10 dBm, which indicates that the performance of the fiber treated according to the method of the invention is only marginally impacted by the precisely controlled level of residual deuterium in the fiber. A gain of 30 dB is measured for the EDFA amplifier before its exposure to the gamma radiation source.

Figure 11:
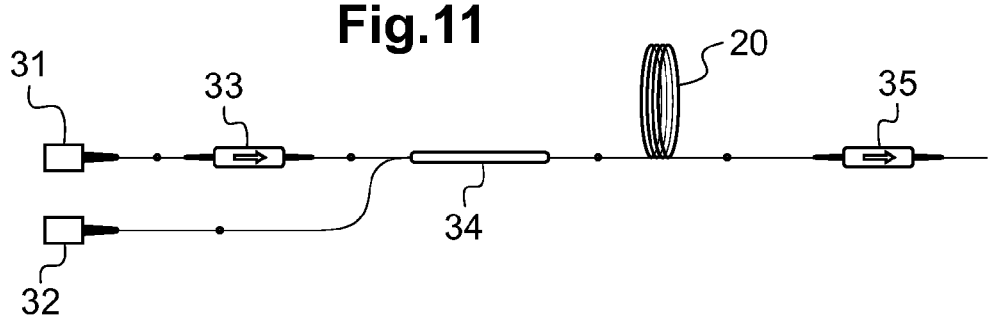
FIG. 11 shows an EDFA-type amplifier based on an optical fiber of the invention.
Figure 12:
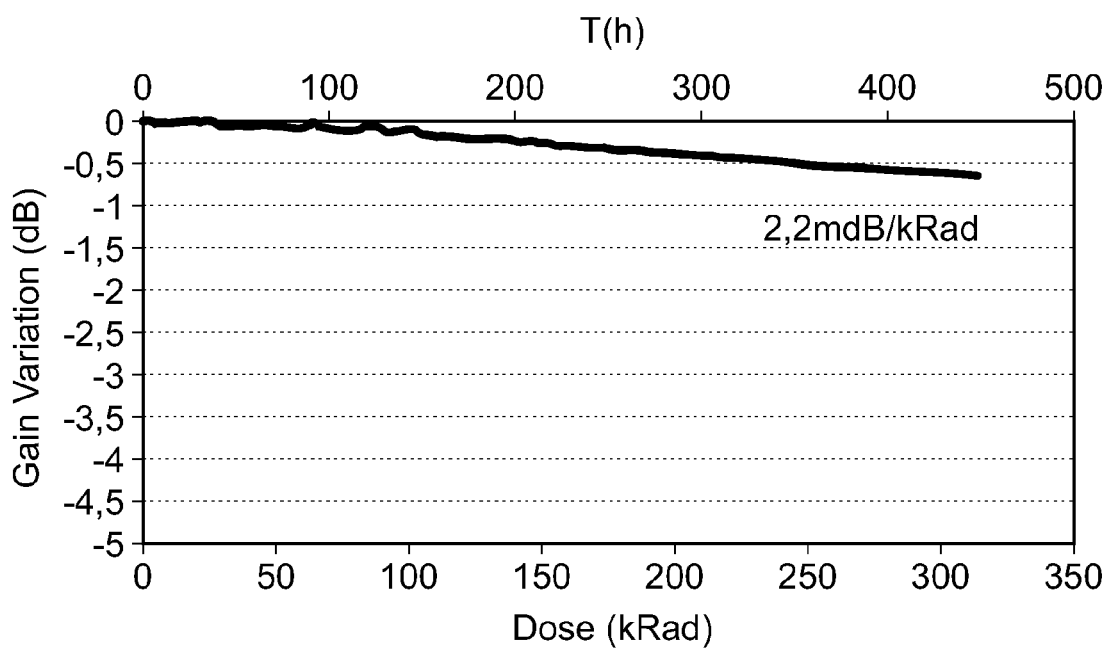
FIG. 12 is a curve of measurement of gain variation of an EDFA as shown in FIG. 11, as a function of the duration of exposure to a cobalt-source radiation and as a function of the cumulated dose of radiation received.

The output power of the EDFA amplifier is measured as a function of the duration of exposure to the gamma-radiation Cobalt source. FIG. 11 represents a curve of measurement of the gain variation of the EDFA presented hereinabove as a function of the duration of exposure to the gamma radiation and thus as a function of the cumulated dose of radiation received. It is observed in FIG. 11 a reduction of power of only 0.5 dB for a cumulated dose of 250 kRad. The reduction of power of the curve in FIG. 11 is almost-linear as a function of the dose, with a slope of $2.2 \cdot 10^{-3}$ dB/kRad.

The method described herein is hence very efficient to reinforce the resistance of an optical fiber or of an EDFA to a source of radiation. Moreover, and unlike the prior methods, the method does not penalize the efficiency in terms of optical transmission or optical amplification, according to the type of optical fiber and the use thereof, for example for an EDFA.

Advantageously, the step(s) of gaseous substance incorporation and/or of desorption are performed at low temperature, generally lower than 120° C. Maintaining a low temperature allows to limit the fixation of hydrogen and the creation of permanent bonds, of the O—H type, generating absorptions harmful to the transmission or amplification of optical signals.

It is verified that the assembly consisted of the erbium-doped and deuterium-loaded amplifier by performing a thermal annealing at 80° C. during 180 consecutive hours. No variation of power is observed at the output of the EDFA amplifier during this thermal annealing, which indicates that there is no loss of deuterium.

A numerical simulation allows to calculate the desorption of hydrogen by diffusion in silica. It is considered herein that the tight coating 24 is totally impervious to hydrogen and hence prevents any diffusion of hydrogen through this coating. The only possible path of diffusion for hydrogen is then along the fiber via one or the other of its two ends. This amounts to consider that the optical fiber has a radius that is not of 62.5 µm, but of several meters. An example of calculation for a fiber of 1 m long at a temperature of 80° C. indicates that the bringing of an hydrogen-saturation concentration to a concentration equal to 5% of the saturation value is performed over a duration of $2.10^9$ hours, i.e. about 300 000 years. In practice, the fibers treated according to the method described do not undergo but an extremely marginal loss of their initial loading with hydrogen or deuterium during their lifetime, which is generally of 5 to 20 years.

The invention claimed is:

1. A method of manufacturing a radiation-resistant optical fiber, the method comprising the following steps:
   a. Manufacturing a silica optical fiber preform having a longitudinal axis, a core and an optical cladding;
   b. Forming, in the preform, at least one longitudinal cavity;
   c. Drawing said preform so as to form a silica optical fiber comprising a core, an optical cladding and at least one longitudinal cavity, said longitudinal cavity having at least one opening at one end of the optical fiber;
   d. Applying, during step c) of fiber drawing, a gas-tight coating, while keeping said at least one opening towards a longitudinal cavity at one end of the optical fiber;
   e. Exposing the optical fiber to a gaseous substance, comprising gaseous hydrogen and/or gaseous deuterium, in conditions of controlled pressure, temperature and duration of exposure so as to incorporate a determined quantity of said gaseous substance in the silica via said at least one opening;
   f. Closing any opening at both ends of the optical fiber so as to form an optical fiber incorporating said gaseous substance and said optical fiber being tight to the diffusion of said gaseous substance outside the optical fiber.

2. The method of manufacturing a radiation-resistant optical fiber according to claim 1, wherein step b) of forming, in the preform, at least one longitudinal cavity comprises the formation of a longitudinal groove in said preform or the formation of a cylindrical hole of axis parallel to the longitudinal axis of the preform or the assembly of a hollow tube.

3. The method of manufacturing a radiation-resistant optical fiber according to claim 1, wherein step f) of closing comprises a step of welding one end of said optical fiber to another solid optical fiber and/or a step of necking welding one end of the optical fiber, said necking welding being adapted to close said optical fiber end.

4. The method of manufacturing a radiation-resistant optical fiber according to claim 1, comprising, following step e) of incorporating a gaseous substance and before step f) of closing, an additional step of desorbing said incorporated gaseous species so as to reduce the incorporated gaseous species concentration in the optical fiber.

5. The method of manufacturing a radiation-resistant optical fiber according to claim 1, comprising a step of measuring the optical transmission or the optical back-scattering through the core of the optical fiber during step c) of injecting a gaseous substance and/or during step e) of exposing to a gaseous substance and/or during the step of desorption of said incorporated gaseous species, so as to measure the quantity of gaseous substance incorporated in the silica fiber.

6. The method of manufacturing a radiation-resistant optical fiber according to claim 1, wherein said optical fiber includes a second cladding surrounding the first optical cladding and wherein said longitudinal cavity is located in the first optical cladding.

7. The method of manufacturing a radiation-resistant optical fiber according to claim 1, wherein said gaseous substance is chosen among gaseous hydrogen and/or gaseous deuterium.

8. A radiation-resistant silica optical fiber comprising:
a core;
an optical cladding;
wherein said optical fiber further includes:
at least one longitudinal cavity arranged inside the optical cladding, the longitudinal cavity being closed at both ends of the optical fiber,
said silica optical fiber comprising a determined concentration of gaseous substance, comprising gaseous hydrogen and/or gaseous deuterium; and
a coating tight to the diffusion of said gaseous substance.

9. The radiation-resistant silica optical fiber according to claim 8, wherein the core of the optical fiber comprises one or several elements among: silicon, germanium, phosphorus, aluminum, boron, fluorine and/or one or several rare-earth dopants among lanthanum, cerium, erbium, ytterbium, neodymium, thulium and/or holmium.

10. The radiation-resistant silica optical fiber according to claim 8, wherein said optical fiber is a microstructured optical fiber, a photonic crystal optical fiber, an air-clad fiber, a polarization-maintaining optical fiber, a polarizing optical fiber, a double-clad optical fiber, a multi-core optical fiber or a multi-clad optical fiber.

11. An optic-fiber device comprising at least one radiation-resistant silica optical fiber according to claim 8.

12. The method of manufacturing a radiation-resistant optical fiber according to claim 1, wherein said gas-tight coating is made of carbon or metal.

13. The method of manufacturing a radiation-resistant optical fiber according to claim 2, wherein step f) of closing comprises a step of welding one end of said optical fiber to another solid optical fiber and/or a step of necking welding one end of the optical fiber, said necking welding being adapted to close said optical fiber end.

14. The method of manufacturing a radiation-resistant optical fiber according to claim 4, comprising a step of measuring the optical transmission or the optical back-scattering through the core of the optical fiber during step c) of injecting a gaseous substance and/or during step e) of exposing to a gaseous substance and/or during the step of desorption of said incorporated gaseous species, so as to measure the quantity of gaseous substance incorporated in the silica fiber.

15. The radiation-resistant silica optical fiber according to claim 8, wherein the tight coating is made of carbon or metal.

16. The radiation-resistant silica optical fiber according to claim 15, wherein the core of the optical fiber comprises one or several elements among: silicon, germanium, phosphorus, aluminum, boron, fluorine and/or one or several rare-earth dopants among lanthanum, cerium, erbium, ytterbium, neodymium, thulium and/or holmium.

17. The radiation-resistant silica optical fiber according to claim 15, wherein said optical fiber is a microstructured optical fiber, a photonic crystal optical fiber, an air-clad fiber, a polarization-maintaining optical fiber, a polarizing optical fiber, a double-clad optical fiber, a multi-core optical fiber or a multi-clad optical fiber.

18. An optic-fiber device comprising at least one radiation-resistant silica optical fiber according to claim 9.

19. An optic-fiber device comprising at least one radiation-resistant silica optical fiber according to claim 10.

20. An optic-fiber device comprising at least one radiation-resistant silica optical fiber according to claim 15.

* * * * *